(12) United States Patent
Tonkin et al.

(10) Patent No.: US 7,494,572 B2
(45) Date of Patent: Feb. 24, 2009

(54) WATER STILL AND METHOD OF OPERATION THEREOF

(75) Inventors: Mark Christopher Tonkin, Ripe Lane (GB); Mark Andrew Young, Hemel Hempstead (GB); Neil David Eckert, East Sussex (GB)

(73) Assignee: Design Technology and Innovation Ltd., Surrey (GB)

( * ) Notice: Subject to any disclaimer, the term of this patent is extended or adjusted under 35 U.S.C. 154(b) by 0 days.

(21) Appl. No.: 10/459,827

(22) Filed: Jun. 10, 2003

(65) Prior Publication Data
US 2003/0209419 A1 Nov. 13, 2003

Related U.S. Application Data

(63) Continuation of application No. 09/369,805, filed on Aug. 6, 1999, now abandoned.

(51) Int. Cl.
*B01D 3/02* (2006.01)
*B01D 61/36* (2006.01)
*C02F 1/04* (2006.01)

(52) U.S. Cl. .......... 203/10; 159/DIG. 27; 159/DIG. 28; 202/176; 202/182; 203/100; 210/640

(58) Field of Classification Search .......... 159/DIG. 15, 159/DIG. 27, DIG. 28; 202/176, 182, 266, 202/267.1, 267.2; 203/10, 86, 100; 210/640; 95/52; 96/4
See application file for complete search history.

(56) References Cited

U.S. PATENT DOCUMENTS

| | | | | |
|---|---|---|---|---|
| 3,340,186 A | * | 9/1967 | Weyl | 210/651 |
| 3,359,917 A | * | 12/1967 | Cooprider | 417/518 |
| 3,397,117 A | * | 8/1968 | Smith et al. | 202/234 |
| 3,497,423 A | * | 2/1970 | Rodgers | 202/174 |
| 3,501,381 A | * | 3/1970 | Delano | 202/83 |
| 3,785,931 A | * | 1/1974 | Coffey et al. | 202/234 |
| 4,187,151 A | * | 2/1980 | Hanning | 202/185.3 |
| 4,219,387 A | * | 8/1980 | Gruntman | 202/182 |
| 4,267,021 A | * | 5/1981 | Speros et al. | 202/176 |
| 4,527,927 A | * | 7/1985 | Bucherre | 405/53 |
| 4,545,862 A | * | 10/1985 | Gore et al. | 203/10 |

(Continued)

FOREIGN PATENT DOCUMENTS

GB   1 541 283   *   2/1979

(Continued)

*Primary Examiner*—Virginia Manoharan
(74) *Attorney, Agent, or Firm*—Ohlandt, Greeley, Ruggiero & Perle, L.L.P.

(57) ABSTRACT

A mechanical water still (10) includes an impervious dome-like upper surface (12) and a membrane base (14) that is coupled (26) to the impervious dome-like structure (12) to form, when inflated, a chamber (20). The membrane base (14) supports a water pervaporation process therethrough. A water collection well (16) has an opening into which water droplets condensed from the water pervaporation process collect. The water collection well (16) is sited within the membrane base (14) and generally extends outwardly and downwardly from the membrane base (14), as shown in FIG. 1. In use, a contaminated water source (24) is brought into, ideally, complete contact with the membrane base (14), with the water collection well (16) arranged both to act as a heat sink into the water source (24) and to provide stability to the water still (10) when floating and immersed in the water source (24).

26 Claims, 4 Drawing Sheets

U.S. PATENT DOCUMENTS

| | | | | |
|---|---|---|---|---|
| 4,585,523 A * | 4/1986 | Giddings | | 202/236 |
| 4,620,900 A * | 11/1986 | Kimura et al. | | 202/172 |
| 4,698,135 A * | 10/1987 | Raab | | 202/234 |
| 4,728,397 A * | 3/1988 | Kjellander et al. | | 202/180 |
| 4,769,273 A * | 9/1988 | Hoeschele et al. | | 428/215 |
| 4,781,837 A * | 11/1988 | Lefebvre | | 210/640 |
| 4,818,345 A * | 4/1989 | Jonsson | | 202/163 |
| 4,882,012 A * | 11/1989 | Wasserman | | 202/176 |
| 4,915,301 A * | 4/1990 | Munteanu | | 239/45 |
| 4,959,127 A * | 9/1990 | Michna | | 202/177 |
| 5,181,991 A * | 1/1993 | Deutsch | | 202/176 |
| 5,232,085 A * | 8/1993 | Hayashi et al. | | 202/182 |
| 5,290,403 A * | 3/1994 | Saask | | 202/182 |
| 5,300,197 A * | 4/1994 | Mitani et al. | | 202/177 |
| 5,445,731 A * | 8/1995 | Tuohey et al. | | 202/173 |
| 5,468,351 A * | 11/1995 | Hirota et al. | | 202/234 |
| 5,595,662 A * | 1/1997 | Sanderson | | 202/234 |
| 5,595,690 A * | 1/1997 | Filburn et al. | | 261/104 |
| 6,254,785 B1 * | 7/2001 | Phifer et al. | | 210/747 |
| 6,440,275 B1 * | 8/2002 | Domen | | 202/234 |
| 6,484,439 B1 * | 11/2002 | Tonkin et al. | | 47/48.5 |
| 6,607,639 B1 * | 8/2003 | Longer | | 203/10 |
| 6,793,824 B2 * | 9/2004 | Tonkin et al. | | 210/640 |
| 6,887,385 B2 * | 5/2005 | Tonkin et al. | | 210/640 |
| 7,166,224 B2 * | 1/2007 | Tonkin et al. | | 210/640 |

FOREIGN PATENT DOCUMENTS

| | | | |
|---|---|---|---|
| WO | 95/24260 | * | 9/1995 |
| WO | 00/28807 | * | 5/2000 |
| WO | 01/53211 | * | 7/2001 |

* cited by examiner

WATER STILL AND METHOD OF OPERATION THEREOF

CROSS REFERENCE TO RELATED APPLICATIONS

This application is a continuation of U.S. application Ser. No. 09/369,805, filed on Aug. 6, 1999, and now abandoned.

BACKGROUND TO THE INVENTION

This invention relates, in general, to water stills and is particularly, but not exclusively, applicable to water stills that provide potable water from a contaminated water resource, such as the sea or brackish water.

SUMMARY OF THE PRIOR ART

In arid or harsh environs, there is often difficulty in locating or providing, at low cost, potable water for immediate consumption, for cooking or for rehydrating, for example, food or drugs for human or animal consumption. For example, countries around The Gulf have vast seawater reserves, but little drinking water inland. Consequently, inhabited settlements are clustered around free-flowing rivers that provide a major source of fresh water or around ports that are either served by expensive desalination plants or by pipe networks from remote reservoirs. Also, saline rich or contaminated water cannot be used for irrigation since it is generally harmful to plant physiology, and so some form of purification is required if such water is to be utilized for food production. Consequently, crop production may be limited by any restrictions applied to the supply of water to the crop, with the restrictions arising from limited availability of suitably clean water or the cost of actually producing suitably clean water. In other words, although water in a generically "contaminated" form may be readily available, purification of the contaminated water to a level necessary for its intended use may not be economically viable.

Harsh environments, in terms of the securing of potable water for human existence, may be encountered at sea (when stranded in a life raft after a yachting accident), in the desert and even during inter-planetary exploration. Furthermore, natural disasters, including drought, flood and earthquake, can also significantly and adversely interrupt the supply of potable water to otherwise adequately serviced areas. Indeed, in these latter instances it may be necessary actually to ship potable water to the effected area in tankers, which is extremely expensive and logistically difficult to accomplish in a short time-frame.

It is also interesting to note that survival packs required by maritime law and used by armies actually include significant quantities of packaged potable water and that a significant proportion of the overall weight of the survival pack is therefore directly attributable to the volume of water carried. Consequently, survival packs are generally bulky and, if carried, cause additional stress to the bearer.

The re-cycling of water in space is also of considerable concern to space agencies, such as NASA. Moreover, the density of water imposes a small but limiting factor in space flights, with it essential that the amount of water carried by a space-craft be limited at blast-off to restrict weight and the requirement for additional thrust and hence more fuel. Re-cycling is therefore essential. Furthermore, with future potential inter-planetary exploration planned for after the turn of the new millennium, the identification of water and its effective conversion into either a potable supply or one suitable for hydroponics are significant issues.

Desalination mechanisms used on an industrial scale include evaporation techniques, electrolysis and osmosis; all are relatively expensive and often require vast systems and/or the supply of power. Clearly, in emergency situations (for example), such systems cannot just materialise and, even if present, may not function in view of the requirement to provide a constant and substantial power supply.

A need therefore exists in relation to the provision of a relatively simple and inexpensive water purification system.

SUMMARY OF THE INVENTION

According to a first aspect of the present invention there is provided a water still comprising: a chamber having a substantially impervious upper section and a base coupled to the substantially impervious upper section, the base formed from a membrane supporting a water pervaporation process therethrough; and a water collection well having an opening into which water droplets condensed within the chamber from the water pervaporation process collect, the water collection well sited within the base and generally extending outwardly therefrom.

Preferably, the membrane is non-porous.

A plurality of condensation trays are preferably formed within the chamber, wherein the plurality of condensation trays cause water droplets to be ferried into the water collection well.

In another aspect of the present invention there is provided a mushroom-shaped water still comprising: a humidity chamber formed from a substantially impervious domed upper section coupled to a membrane base supporting a water pervaporation process therethrough; a thermally conductive water collection well having an opening into which water droplets condensed within the humidity chamber from the water pervaporation process collect, the water collection well sited within the base and generally extending downwardly therefrom; and a tap coupled to the thermally conductive water collection well for drawing potable water from the mushroom-shaped water still.

In a preferred embodiment, the membrane comprises a copolyetherester elastomer with a water vapor transmission rate at least 400 $g/m^2/24$ hr, and preferably a water vapor transmission rate of in excess 1000 $g/m^2/24$ hr.

In a further aspect of the present invention there is provided a method of purifying contaminated water, comprising: forming a humidity chamber having a substantially impervious upper surface coupled to a membrane base that supports a water pervaporation process therethrough; providing a water collection well having an opening within the humidity chamber; providing a contaminated water supply juxtaposed the membrane base, thereby forming a vapor pressure gradient thereacross; and directing water condensed within the humidity chamber into the opening.

The method may optionally further comprise the step of using the temperature difference between the humidity chamber and the water source to condense the water vapor, by using the water collection well as a "heat sink."

Preferably, the method also comprises channeling water droplets condensed within the humidity chamber away from the membrane base and into the water collection well.

In a further aspect of the present invention there is provided a water still comprising: a humidity chamber formed between a substantially impervious section and a non-porous membrane supporting a water pervaporation process therethrough; and a water collection well having an opening into which water droplets condensed within the chamber from the water pervaporation process collect, the water collection well sited towards a base of the humidity chamber.

Preferably, the substantially impervious section provides side walls and a base for the water still and thereby acts to funnel water droplets into the water collection well. In use, the entire water still is immersed.

In yet another aspect of the present invention there is provided a method of purifying contaminated water, comprising: forming a humidity chamber having a substantially impervious surface coupled to a non-porous membrane that supports a water pervaporation process therethrough; providing a water collection well having an opening towards a bottom of the humidity chamber; contacting a contaminated water supply with the non-porous membrane, thereby forming a vapor pressure gradient thereacross; and directing water condensed within the humidity chamber into the opening under the action of gravity.

Advantageously, the water still of the present invention provides a water purification system that has a simple mechanical construction and which can be deployed quickly. With a preferred embodiment potentially having no moving parts, the manufacturing costs and complexity are low. Indeed, the water still can be packaged into a low-weight, compact form that can readily be assembled. Scaling of the water still design of the preferred embodiments is arbitrary. A supply of potable water can therefore be obtained without the use of manufactured energy sources (batteries, generators, etc) as the process operates by the use of naturally occurring heat differentials and any optional moving parts can be driven, if desired, by natural forces such as solar, wind or wave energy.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
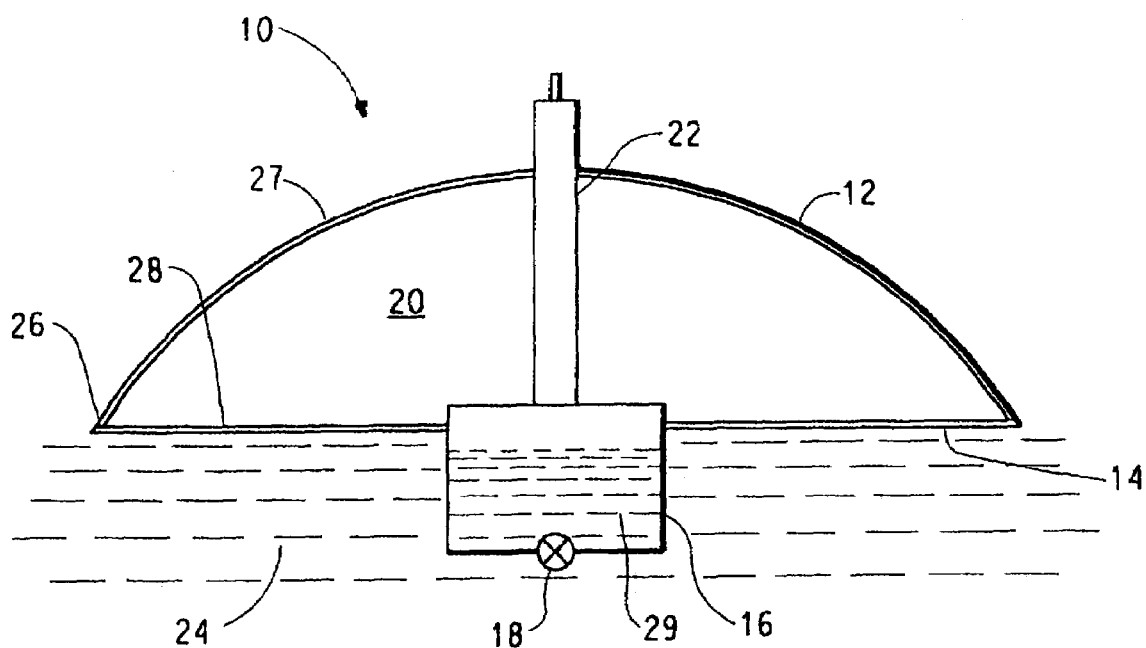
FIG. 1 is a schematic diagram of a water still, shown in situ, embodying the underlying principles of the present invention.

The underlying principles of construction of the water still 10 of the present invention are shown, in exemplary form, in the basic block diagram of FIG. 1.

The water still 10 comprises a domed outer section 12 coupled to a hydrophilic membrane base 14. The hydrophilic membrane base 14 acts as a floor and co-operates with a water collection well 16 that provides stabilizing ballast to the water still 10 (in situ). Typically, the water collection well 16 is centrally located within the geometry of the water still 10, and extends downward in a stalk-like fashion to cause the water still 10 to have a mushroom-like cross-section. A tap 18, preferably incorporating a one-way valve, is generally located at or near the bottom of the water collection well 16. The domed outer section 12, which is preferably made from a durable, heat absorbing and substantially impervious layer of material (such as polyvinyl chloride, other plastics, metal and the like), the hydrophilic membrane base 14 and the water collection well 16 form a chamber 20. A central shaft 22 may extend between the water collection well and possibly beyond the domed outer section 12. The central shaft 22 can provide structural support to the water still 10 generally, and specifically the domed outer section 12 through appropriate coupling of the domed outer layer thereto.

In operation, the water still floats in a contaminated or otherwise non-potable water source 24, such as the sea, a lagoon, a river or in brackish water, with an intersection 26 between the domed outer section 12 and the hydrophilic membrane base 14 below the surface of the water source 24. The domed outer section 12 and the hydrophilic membrane base 14 are typically glued, welded or stitched together, although other securing mechanisms are clearly possible. The intersection 26 is, however, watertight. Once immersed in a water source 24, water vapor pervaporates through the hydrophilic membrane base 14 to cause the chamber 20 to have a relatively high humidity.

The inner surfaces of the chamber 20 act as condensation surfaces, with water droplets generally and principally directed into the water collection well 16. Preferably, the central shaft 22 (which also acts as a condensation surface) is made from a material with good thermal conduction properties, such as galvanized steel. Of course, the central shaft 22 could be made from a plastic material which can resist contact with water better than can metal, although strength and rigidity is generally inferior to that of metal, although metals may need to be treated to prevent and resist rusting and other forms of corrosion/fatigue. The water collection well 16 is also preferably made from the same material as the central shaft 22, although again the requirement is that the water collection well 16 has good thermal conduction properties. The water collection well 16, in use, therefore acts as a heat sink into the relatively cool water source 24, with any thermally coupled internal structure (such as the central shaft 22) therefore also benefiting from an ability to sink heat into the surrounding water source 24 via the water collection well 16. The rate of condensation is therefore increased through the use of the water collection still as a heat sink an d the cooling effect provided by the surrounding water.

As will be understood, condensation generally occurs on the coldest surfaces and so those having heat sinking capabilities (ultimately into the surrounding contaminated water supply) are most efficient. Furthermore, the efficiency of the condensation surfaces is extremely important in relation to the optimum performance of the water still since condensation reduces humidity within the chamber 20 and therefore enhances the vapor pressure gradient across the hydrophilic membrane, thereby increasing the rate of water vapor transmission through the membrane.

It has been found that the hydrophilic membrane base 14 operates more efficiently to pass more water vapor when a flow of air is able to encourage water pervaporate to be lifted from its surface 28. Consequently, it is preferable that the domed outer section 12 is an impervious heat absorbing layer to both prevent evaporation from potable water 29 collected (i.e. condensate) within the water collection well 16 or escape of water vapor from the chamber, generally. Moreover, with the domed outer layer 12 actually designed to absorb heat, a natural convection current may be established within the chamber 20 that encourages an increased rate in the pervaporation process from the surface 28 of the hydrophilic membrane base 14.

In order to encourage cooling within the chamber, a particular embodiment employs a water-absorbing surface 27 on the outside of the domed outer section 12, whereby evaporation of absorbed water by the action of the sun produces a cooling effect within the water still 10, generally, and more specifically in the upper regions of the chamber 20.

In a preferred embodiment, the portion of the water still 10 floating above the surface of the contaminated water source 24 is generally hemispherical in shape, with the entire hydrophilic membrane base 14 always totally submersed.

As regards a relative internal height profile within the water still 10, the water collection well 16 is raised relatively to the surface of the hydrophilic membrane base 12; as, with an increased lip, the clean potable water collected as condensate ultimately within the water collection well 16 does not significantly spill over the sides when the water still 10 is adversely affected by wave action or the like.

Figure 2:
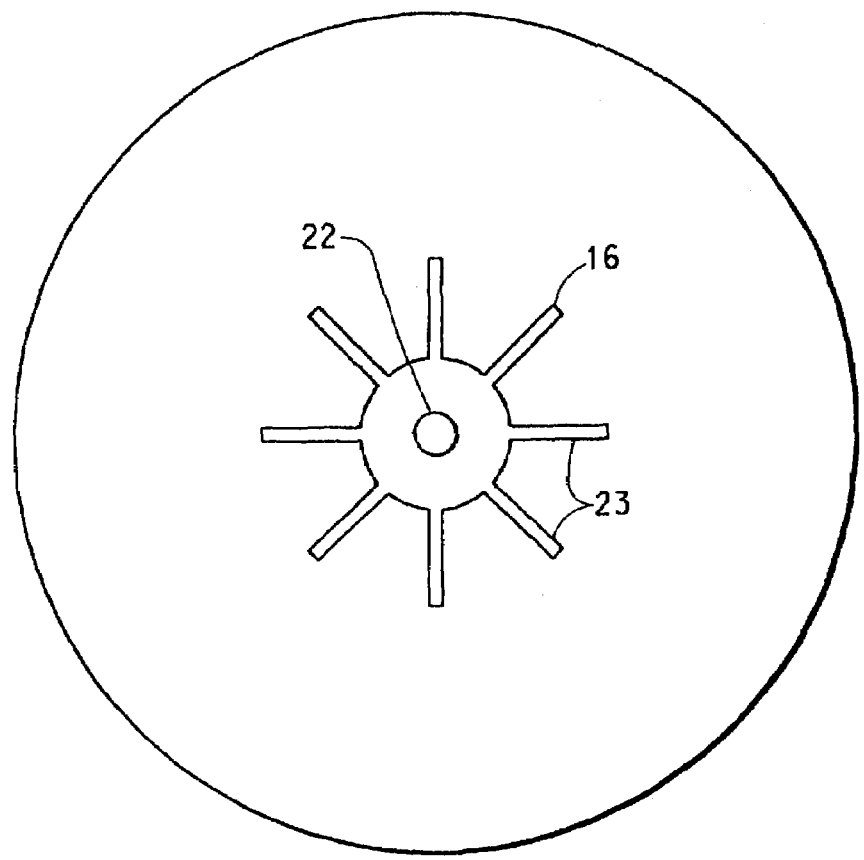
FIG. 2 is a bottom plan view of the water still of FIG. 1.

Turning briefly to the bottom plan view of the water still 10 shown in FIG. 2, a preferred shape of the water collection well 16 can be seen. While also generally providing ballast to the water still 10 to maintain substantially upright water still orientation within the water, the water collection well 16 preferably contains a number of vanes 23 that have three purposes. First, the efficiency of the water collection well 16 as a heat sink in increased through increased surface area. Second, the increased surface area increases the area for condensation and water storage. Third, when the water collection well is submerged (either partially or preferably entirely), the vanes improve stability of the water still 10.

It is preferable that water still 10 is weighted to ensure that hydrophilic membrane base 14 is always, in use, below the surface of the water source 24, with this achieved (at least in part) by the actual weight of the water collection well 16 and also the clean potable water that has been collected as condensate within the water collection well 16. Beneficially, with the hydrophilic membrane base 14 always below the surface, the likelihood of damage and puncture of the membrane is reduced since objects will generally collide against the edges of the water still 10 and hence contact the domed outer layer 12. Furthermore, with the hydrophilic membrane base 14 always below the surface, the efficiency of the membrane (i.e. its performance) is at least improved if not optimized.

The design of the water still 10 of the preferred embodiments of the present invention renders it suitable for use in a number of environments, including open seas, harbors, rivers, flooded plains and sheltered lagoons. The features of the design are such that is has an inherent capability of riding waves whilst remaining substantially upright. Alternatively, permanent or semi-permanent stills may be-secured in a fixed position with respect to the bed of the water body in which they are located, or they may be fixed to the bed but caused to move to adapt to changing water depths (for example, in tidal waters).

In summary, the condensate represents a supply of clean potable water which may be microbiologically clean.

Inflation of the chamber 20 can be achieved either using compressed gas or by blowing it up. Clearly, in the case of an industrially sized membrane that yields sufficient quantities of potable water, the former mechanism is preferred and also limits any chance of introducing microbes or the like into the chamber. However, in relation to a survival pack, since the individual is generally likely only to require the pack for a few (and at most several) hours or days before rescue, then self-contamination of the chamber 20 with air containing that individual's microbes is probably insignificant. Compressed gas, in terms of a survival kit, could be supplied by a small canister initially packaged within the water collection well 16. Alternatively, for permanent stills, the chamber 20 may be constructed in a fully expanded state.

A particular design option in relation to a relatively small and compact water still configuration utilizes a telescopic central shaft 22 that can be collapsed into the water collection well 16. The remaining domed outer section 12 and membrane base 14 is made semi-rigid with nylon-type rods, for example, maneuvered and clipped into place to provide any required structural rigidity.

As regards scales of size, this is dependent upon the expected area of deployment. For survival packs, a human requires anything from between about 0.5 liters to about eight liters of drinking water per day (dependent upon physical exertions, temperature and humidity). Consequently, the volume of the water collection well 16 must reflect this requirement, but may be constrained by packaging requirements. Preferably, the capacity of the water collection well in a survival kit will therefore be in the range of 0.5 liters to eight liters, more preferably in the range of one liter to four liters and most preferably around about two liters to three liters. Clearly, other sizes that are more cumbersome could be used for flood alleviation efforts, for example. Similarly, the size of the hydrophilic membrane base area and the condensation chamber should be selected to reflect the intended amount of water to be collected; and similar factors will also influence the nature and thickness of the chosen hydrophilic membrane and the incorporation or otherwise of the optional features disclosed herein.

For a water still system that can supply several cubic meters of potable water per day, a significantly larger water collection well 16 would be required. However, it is interesting to note that the natural buoyancy of the water still 10 of the present invention (arising from the effective air-tight chamber 20) still allows easy tapping-off of the potable water condensed and collected in the water collection well 16. Indeed, the water still remains buoyant (and becomes increasing stable by having a lowered center of gravity) with the condensation and subsequent collection of water in the water collection well 16 by virtue of the principles of Archimedes. With yet larger water stills constructed according to the preferred embodiments of the present invention, a periodic or continuous drawing-off process (employing a pump) could be employed, with the size of water collection well 16 adjusted accordingly.

In one particular embodiment, the water collection well 16 could be selectively detachable from the "canopy section" of the water still to allow easy maintenance and cleaning before re-use. The water collection well 16 could therefore contain a screw-thread and "o"-ring seal arrangement.

As regards the drawing off of potable water through tap 18, the potable water collected in the water collection well 16 provides some limited head of water that acts to purge interconnected drain pipes of accumulated debris and algae growths about the actual outlet port.

Figure 3:
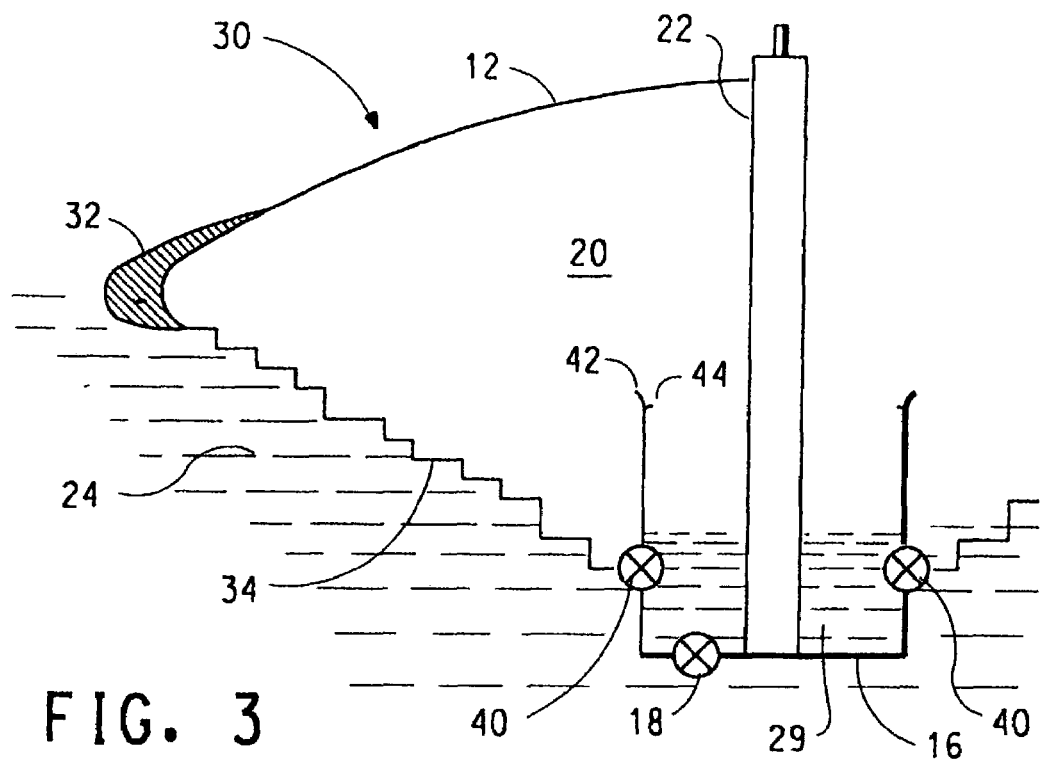
FIG. 3 is a partial sectional view of a water still having various preferred and optional features that may be incorporated into the basic water still of FIG. 1.

FIG. 3 shows a partial sectional view through a water still 30 that incorporates several possible design implementations and variants that may be optionally included (singly or altogether) in the basic water still 10 of FIG. 1. For example, the water still 30 of FIG. 3 has an external buffer 32 that surrounds the periphery of the water still 30. As will be appreciated, the buffer 32 (which may be inflated or may be made of a durable material, such as rubber) acts to rebuff debris that collides with the water still 30 and hence protects the water still. Additionally, in one particular embodiment, an improved hydrophilic membrane base 34 contains ridges, filaments or corrugations to increase significantly the area of membrane in contact with the water source 24; this improves efficiency of the water still in relation to its overall physical size. In a particular embodiment, the hydrophilic membrane base 34 is stepped to encourage air bubbles always to rise up and away from the surface 38 of the membrane (or a support surface of the membrane). Also, with an inclined hydrophilic membrane base 34, it may be beneficial to include secondary drainage vents 40 at the bottom of the inclination and generally adjacent the water collection well 16. These secondary drainage vents 40, which again preferably have a one-way valve operation, can then be selectively opened to drain any condensate that has collected on the membrane as opposed to within the water collection well 16.

The water collection well 16 is further shown to include an outward-facing lip 42 to prevent any condensate inadvertently lying on the surface 38 of the hydrophilic membrane from entering the water collection well 16. Also, the water collection well 16 may include an internal lip 44, typically of a gauze-like construction, that limits spillage of water from the water collection well 16.

Figure 4:
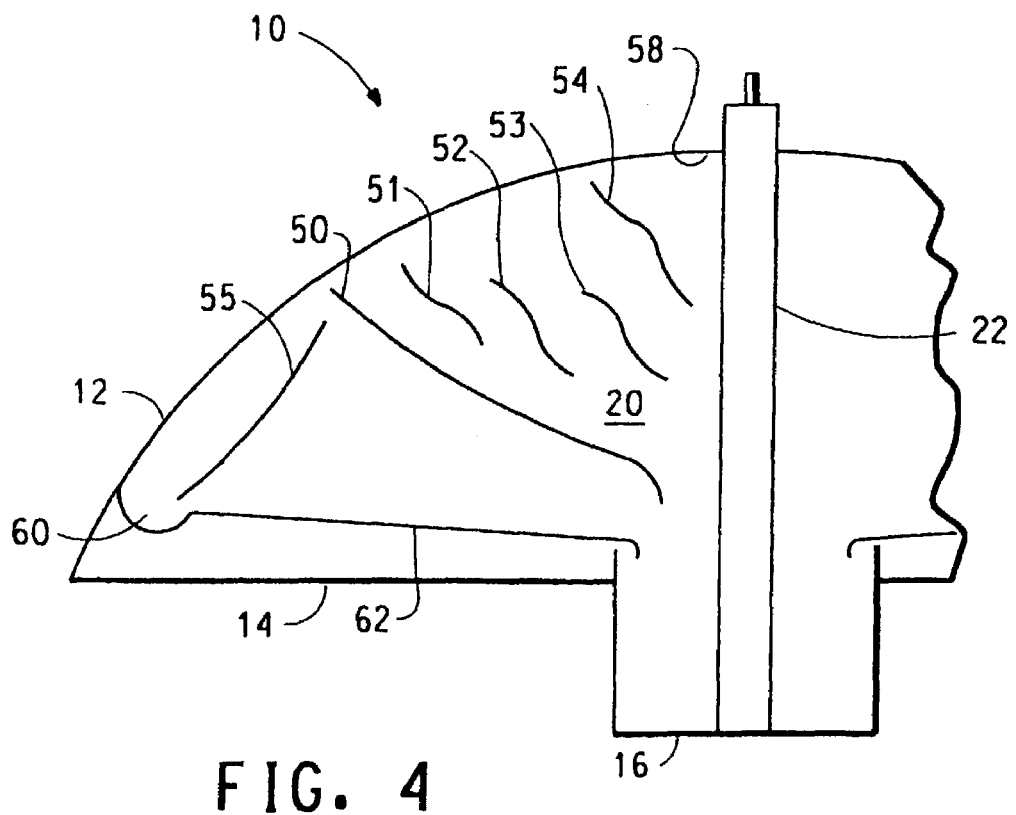
FIG. 4 is a partial sectional view of a water still having optional drip trays, drainage channels and increased condensation surfaces that may be incorporated into the basic water still of FIG. 1 or the water still FIG. 3.

FIG. 4 illustrates possible internal structures for the water still of FIG. 1, for example. First, in order to maximize condensation, the chamber 20 includes a plurality of condensation trays (or surfaces) 50-55. The condensation trays 50-55 are, preferably, integrally formed from the material of the domed outer section 12. Preferably, at least one major condensation tray substantially traverses the radius of the water still 10; this major tray is generally towards the bottom of the chamber 20. Secondary condensation trays 51-54 positioned above the major condensation tray 50 encourage condensed water drops to drop onto the major condensation tray that itself encourages water to fall into the water collection well 16. The various condensation trays 50-55 also act to catch water drops falling from an inner surface 58 of the domed outer section 12, and hence to consolidate the collection of condensate into the water collection well 16.

The major condensation tray 50 is shaped by a number of gentle curves that encourage water droplets to form and roll along both the upper and under sides of the major condensation tray 50, but not to fall onto the hydrophilic membrane base 14.

Co-operating with and partially underlapping the major condensation tray 50 is a feed tray 55 located proximate to an outer edge of the domed outer section 12. Again, in a similar fashion to the major condensation tray 50, the feed tray 55 is shaped by a number of gentle curves that encourage water droplets to form and roll along both its upper and under sides.

Water vapor will condense on an inner surface of the domed outer section 12, which may be smooth or, alternatively, may be designed to encourage vapor condensation (for example by the provision of a spiky, hairy or fuzzy surface). Water droplets that form on the inner surface and fall under the action of gravity are therefore either caught by the major condensation tray 50, the feed tray 55 or a gully 60 formed around the periphery of the domed outer section 12. The inner surface of the outer section 12 may, optionally, also be shaped to encourage condensed water to flow directly into any of these collection means. Clearly, water droplets that roll down the side of the domed outer section 12 fall directly into the gully 60. The feed tray 55 also terminates above the gully to ensure that water droplets condensed thereon fall into the gully 60. Water that enters the gully is communicated to the water collection well 16 via periodically placed narrow feed paths or channels 62, such as open troughs. The area of feed path is minimized to ensure that it does not act as an effective condensation surface, although it is shaped to encourage any water droplets forming on its underside to roll along into the water collection well 16 rather than to fall onto the hydrophilic membrane base 14.

For the sake of clarity, only one side of the internal structure of condensation trays is shown in FIG. 4. However, in summary, the various condensation trays and channels/gullies are arranged to prevent condensate from settling on the top of the hydrophilic membrane base 14, and to pool within the water collection well 16. In order to improve further the operation of the condensation trays 50-55, it is preferably that they are coupled to the heat sink (realized by the construction of the water collection well 16) and that they are made from a material with a good thermal conductivity. However, the latter requirement is generally a trade-off with weight.

Figure 5:
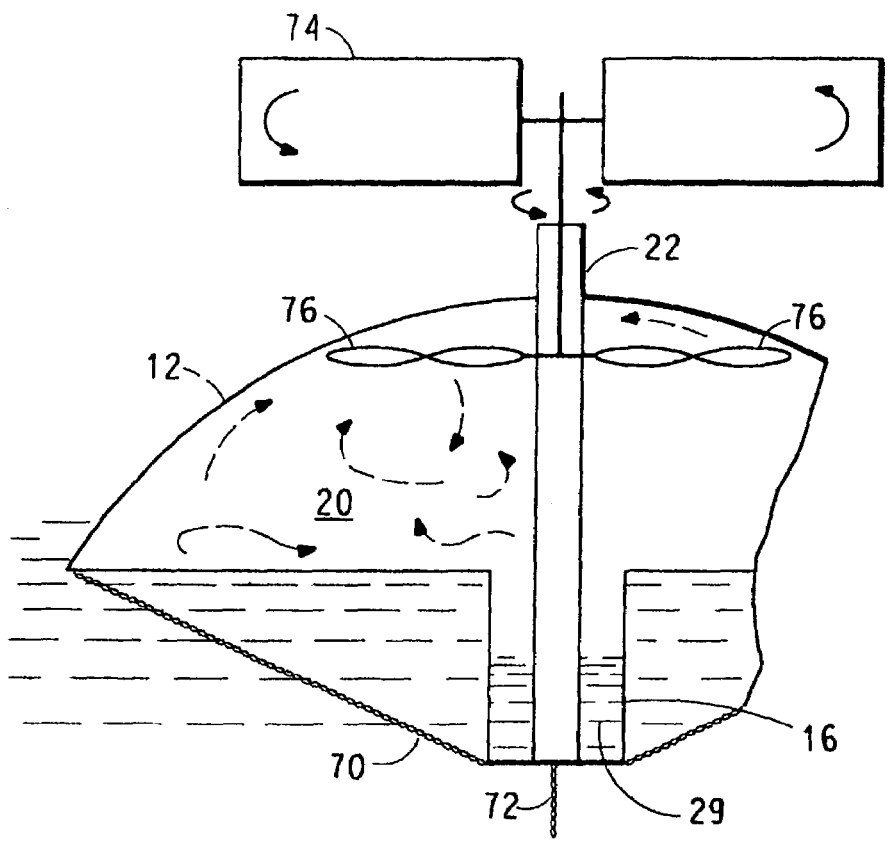
FIG. 5 is yet another partial sectional view of a water still having various preferred and optional features that may be incorporated into the basic water still of FIG. 1 or the water stills of FIG. 3 or 4.

FIG. 5 shows additional, but optional, features that can be incorporated into the basic water still structure of FIG. 1, or any of the more elaborate structures described herein.

To improve overall structural stability of the water still, guide lines 70 may be coupled (e.g. selectively attached) between the periphery of the water still and the water collection well 16. Furthermore, with increasing size, it may be beneficial to provide a tether line 72 from the water still (such as from the bottom of the water collection well 16) to a sea anchor or the like. This tether line 72 may optionally act as a conduit to remove water from the water collection well 16.

Another possible design variant can be realized by the use of a rotating wind vane 74 mechanically coupled to the central shaft 22 and arranged to drive, via a suitable spindle, an internally located fan 76. Although the complexity of the mechanics of the overall structure increase, there is an improvement in the rate of circulation of the high humidity air within the chamber 20, and between the chamber 20 and the water collection well 16, that correspondingly encourages condensation and improves air flow over the surface of the hydrophilic membrane, hence increasing pervaporation therefrom. Such a mechanical arrangement requires no outside power supply and is merely reliant upon wind that is often experienced in coastal regions. Other forms of fan 76 could be employed, such as those benefiting from being driven by wave power or solar power. Generally, the internal fan 76 is arranged to circulate air throughout the chamber 20 and particular towards, across and through the condensation surfaces and the water collection well 16.

Figure 6:
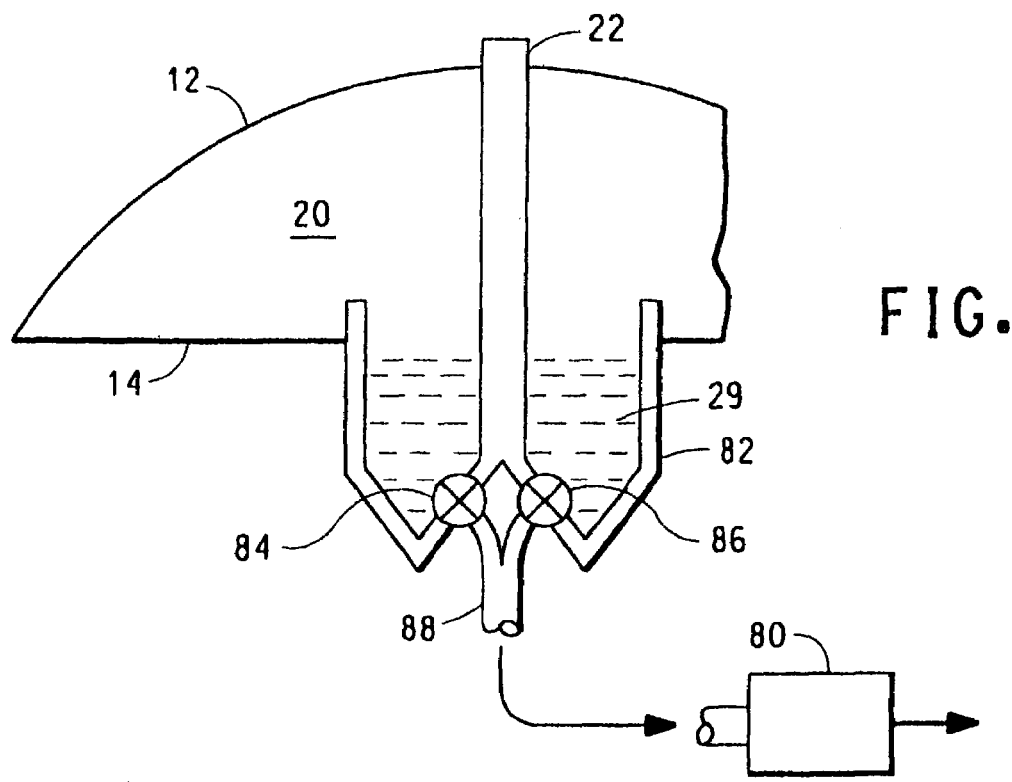
FIG. 6 shows a pump arrangement and collection vessel of an optional but preferred embodiment of any preceding Figure.

The optional features shown in FIG. 6 may also be incorporated into the basic water still arrangement of FIG. 1 (or any other Figure, if desired). The specific detail of FIG. 6 shows a pump arrangement 80 and sectional view of a preferred water collection well (or vessel) 82. As previously indicated, the water collection well 82 has a slightly raised lip relative to a substantially horizontal datum for the hydrophilic membrane base 14. The particular embodiment of FIG. 6 also contains at least one tap 84-86 that is raised slightly above the bottom of the water collection well 82. The tap (in this case a plurality of taps) feeds into a pipe network 88 connected to the pump arrangement 80. It will be appreciated that potable water within the pipe network can also benefit from the cooling effect and heat sinking capabilities of the surrounding water (if any).

Figure 7:
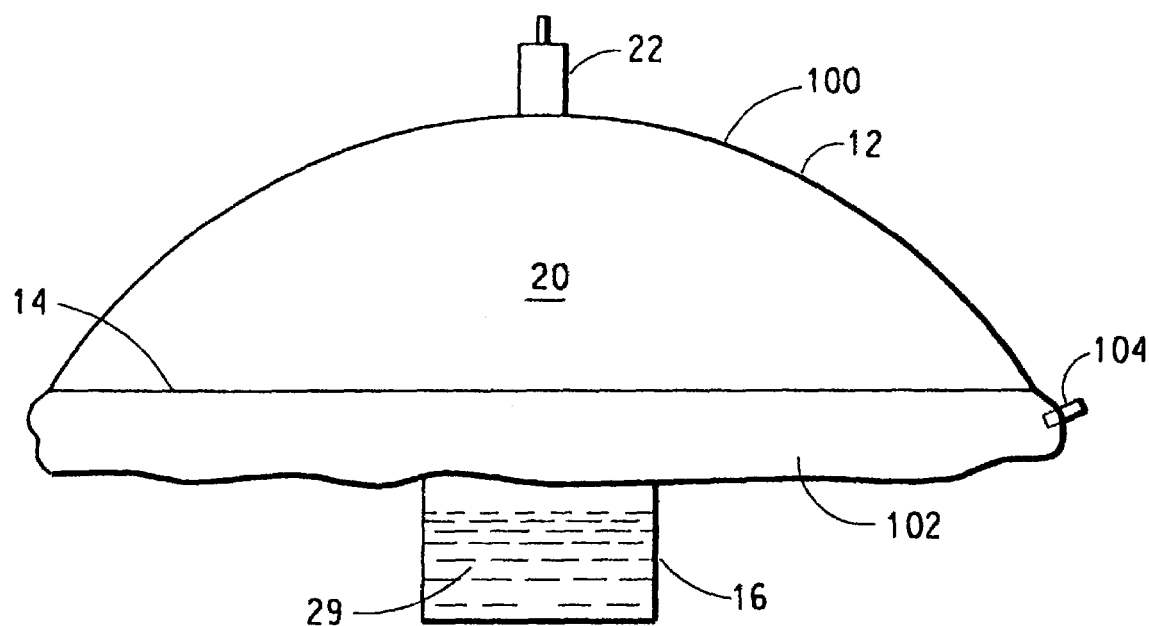
FIG. 7 shows a water still embodying the present invention and including a further supply reservoir.

FIG. 7 shows a water still 100 embodying the present invention and including a further supply reservoir. The principles of construction have generally been discussed previously, although this embodiment includes a substantially impervious reservoir (or bag or pouch) 102 that couples to the hydrophilic membrane base 14. The impervious reservoir (or bag) 102 includes an inlet port 104 through which unclean or otherwise contaminated water can be placed. The impervious reservoir (or bag or pouch) 102 is generally flexible so as to allow the unclean or otherwise contaminated water to be forced against the hydrophilic membrane base 14 upon contact pressure with a surface, such as the ground. This embodiment is particularly applicable in relation to a desert survival kit, since urine, consisting substantially of water, can be used to fill the impervious reservoir (or bag or pouch) 102 on a daily basis, with the hydrophilic membrane ensuring that a supply of potable and sterile water is obtained from the water still 100. In use the reservoir 102 should be filled before dawn so that the high daytime temperature will encourage high rates of pervaporation through the hydrophilic membrane base 14. The domed outer section 12 may then be exposed to the much lower night-time temperatures to encourage water condensation overnight. This system may be further optimized, for example, by providing only a small airspace 20 within the domed outer section 12 so that the cooling effect is optimized; or even by using an initially deflated inflatable structure to create the airspace 20 so that it expands as water vapor passes through the membrane 14. An alternative or additional method of optimization is to use a portion of the impure water to evaporate from the outside surface of the domed outer section 12 to cool the interior thereof and to thus promote condensation.

Figure 8:
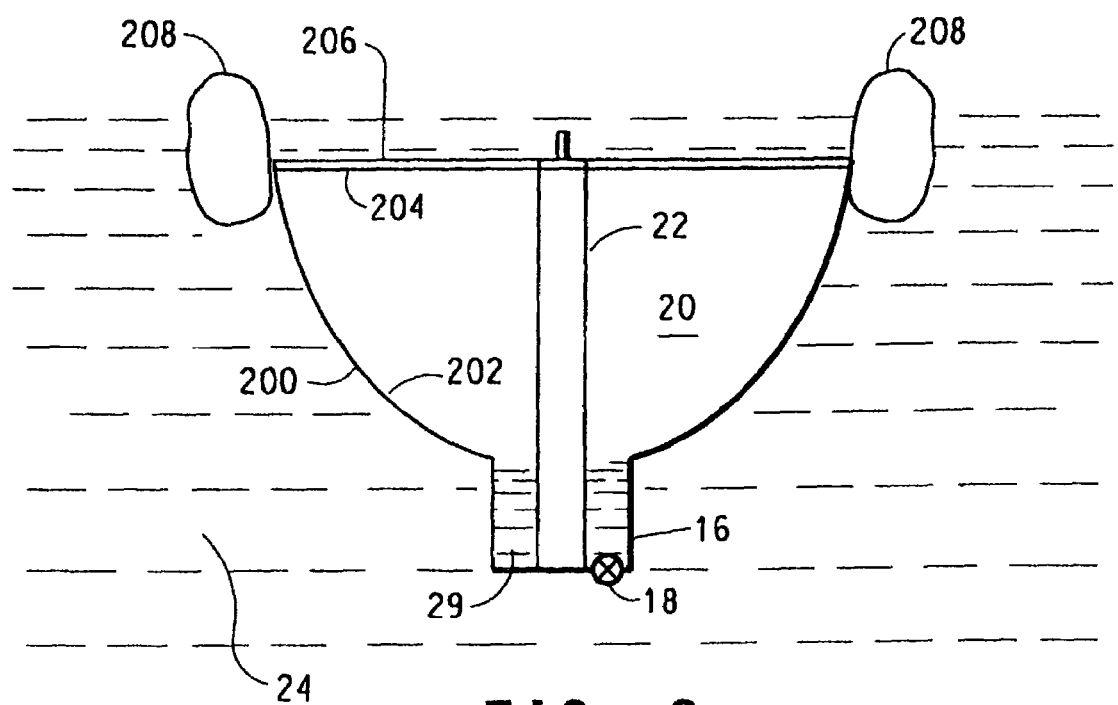
FIG. 8 is an alternative structure for a water still embodying the design concepts of the various embodiments of the present invention.

FIG. 8 is an alternative structure for a water still 200 embodying the design concepts of the various embodiments of the present invention. In this instance, the configuration of the water still 200 is inverted (relative to FIG. 1). An impermeable cone- or bowl-shaped base 202 is sealed by a hydrophilic membrane 204 to provide a humidity enclosure 20. The bottom of the cone- or bowl-shaped base 202 feeds into a water collection well 16 that collects condensed water vapor that pervaporates through the hydrophilic membrane 204. Again, a central shaft 22 may provide both a condensation surface and structural support. Preferably, in use, the water still 200 is fully immersed, although the hydrophilic membrane 204 is preferably located just below the surface where pervaporation through the membrane is aided by the slightly elevated water temperature. To protect the hydrophilic membrane 204 from deterioration, a protective screen 206 or substrate is positioned juxtaposed or in contact with the hydrophilic membrane 204. Contaminated water may therefore be allowed to flow between the surface of the hydrophilic membrane 204 and the protective screen 206. A floatation aid 208, which may also act as a buffer, may be provided about the periphery of the water still 200.

The inverted design of FIG. 8 is advantageous since it always encourages condensate to travel towards the water collection well 16 (under the action of gravity), whilst the design also benefits from substantial (if not total) immersion in relatively cool but contaminated water 244. Consequently, heat is effectively and efficiently sunk from the water still and the condensation process improved. Indeed, with the heat sinking capability of the cone- or bowl-shaped base 202, condensation principally occurs on the inner surfaces of the cone- or bowl-shaped base 202 (as well as any other surface directly coupled to the heat sink). Preferably, the cone- or bowl-shaped base 202 is made from a material with good heat conducting properties, such as metal. The various optional design features of FIGS. 2 to 6 may be included, singly or in combination, within FIG. 8, as will readily be appreciated.

As regards the hydrophilic membrane 204, its profile may be sloped, in either a convex or concave fashion, in order that condensate is guided from its surface towards the water collection well 16. The hydrophilic membrane 204 therefore remains substantially dry at all times, and is generally the warmest surface within the chamber 20.

In the context of the disclosure, hydrophilic membranes for use in the water stills of the various embodiments of the present invention are from hydrophilic polymers. The term "hydrophilic polymer" means a polymer that absorbs water when in contact with liquid water at room temperature according to International Standards Organization specification ISO 62 (equivalent to the American Society for Testing and Materials specification ASTM D 570).

The hydrophilic polymer can be one or a blend of several polymers. For example, the hydrophilic polymer could be a copolyetherester elastomer or a mixture of two or more copolyetherester elastomers, such as polymers available from E.I. du Pont de Nemours and Company under the trade name HYTREL®. Alternatively, the hydrophilic polymer could be polyether-block polyamide or a mixture of two or more polyether-block polyamides, such as the polymers from Elf-Atochem Company of Paris, France available under the name PEBAX™. Other hydrophilic polymers include polyether urethanes or a mixture thereof, homopolymers or copolymers of polyvinyl alcohol and mixtures thereof. The above list is not considered to be exhaustive, by merely exemplary of possible choices of hydrophilic membrane.

A particularly preferred polymer for water vapor transmission in this invention is a copolyetherester elastomer or mixture of two or more copolyetherester elastomers having a multiplicity of recurring long-chain ester units and short-chain ester units joined through ester linkages, said long-chain ester units being represented by the formula:

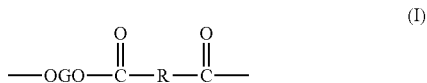

(I)

and said short-chain ester units are represented by the formula:

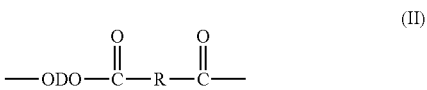

(II)

wherein:

a) G is a divalent radical remaining after removal of terminal hydroxyl groups from a poly(alkylene oxide)glycol having a number average molecular weight of about 400-4000;

b) R is a divalent radical remaining after removal of carboxyl groups from a dicarboxylic acid having a molecular weight less than about 300;

c) D is a divalent radical remaining after removal of hydroxyl groups from a diol having a molecular weight less than about 250; optionally d) the copolyetherester contains 0-68 weight percent, based on the total weight of the copolyetherester, ethylene oxide groups incorporated in the long-chain ester units of the copolyetherester;

e) the copolyetherester contains about 25-80 weight percent short-chain ester units.

The preferred polymer film is suitable for fabricating into thin but strong membranes, films and coatings. The preferred polymer, copolyetherester elastomer and methods of making it our known in the art, such as disclosed in U.S. Pat. No. 4,725,481 for a copolyetherester elastomer with a WVTR of 3500 g/m$^2$/24 hr, or U.S. Pat. No. 4,769,273 for a copolyetherester elastomer with a WVTR of 400-2500 g/m$^2$/24 hr.

The use of commercially available hydrophilic polymers as membranes is possible in the context of the present invention, although it is clearly preferable to have as high a WVTR as possible since the water still is designed to supply potable water. Most preferably, the present invention uses commercially available membranes that yield a WVTR of more than 3500 g/m$^2$/24 hr, measured on a film of thickness 25 microns using air at 23° C. and 50% relative humidity at a velocity of 3 ms$^{-1}$.

The polymer can be compounded with antioxidant stabilizers, ultraviolet stabilizers, hydrolysis stabilizers, dyes, pigments, fillers, anti-microbial reagents and the like.

A useful and well-established way to make membranes in the form of films is by melt extrusion of the polymer on a commercial extrusion line. Briefly, this entails heating the polymer to a temperature above its melting point and extruding it through a flat or annular die and then casting a film using a roller system or blowing the film from the melt. Useful support materials include woven, non-woven or bonded papers, fabrics and screens and inorganic polymers stable to moisture, such as polyethylene, polypropylene, fiberglass and the like. The support material both increases strength and protects the membrane. The support material may be disposed on only one side of the hydrophilic polymer membrane, or on both sides. When disposed on only one side, the support material can be in contact with the water or away from it. Typically, the support material is formed on the outer side of the water still to best protect the membrane from physical damage.

Without being bound by any particular theory, it is believed that the purifying effect of the hydrophilic membrane, realized either in the form of a coating or an unsupported membrane, when in contact with water that may contain suspended or dissolved impurities, solids and emulsions, occurs because highly dipolar molecules, such as water, are preferentially absorbed and transported across the membrane or coating, compared to ions, such as sodium and chloride. When, in addition, a vapor pressure gradient exists across the membrane, water is released from the side not in contact with the source of water, which released water can be condensed to provide potable water and water for agricultural, horticultural, industrial and other uses.

In relation to the hydrophilic membranes used in the preferred embodiments of the present invention, the water transmission characteristics are generally determined using standard test procedure ASTM E96-95—Procedure BW (previously known and named as test procedure ASTM E96-66—Procedure BW). These standard test procedures are used to determine the water vapor transmission rate (WVTR) of a membrane, and use an assembly based on a water-impermeable cup (i.e. a "Thwing-Albert Vapometer"). The water-impermeable cup contains water to a level about nineteen millimeters below the top of the cup (specifically, 19 mm±6 mm). The opening of the cup is sealed watertight with a water-permeable membrane of the test material to be measured, leaving an air gap between the water surface and the membrane. In procedure BW, the cup is then inverted so that water is in direct contact with the membrane under test. The apparatus is placed in a test chamber at a controlled temperature and humidity, and air is then blown across the outside of the membrane at a specified velocity. Experiments are run in duplicate. The weights of the cups, water and membrane assemblies are measured over several days and results are averaged. The rate at which water vapor permeates through the membrane is quoted as the "water transmission vapor rate", measured as the average weight loss of the assembly at a given membrane thickness, temperature, humidity and air velocity, as expressed as mass loss per unit membrane surface area and time. The WVTR of membranes or films according to ASTM E96-95—Procedure BW is typically measured on a film of thickness twenty five microns and at an air flow rate of three meters per second (3 ms$^{-1}$), air temperature twenty three degrees Celsius (23° C.) and fifty percent (50%) relative humidity.

Advantageously, if a hydrophilic polymer such as HYTREL® (or the like) is used to provide the membrane base 16, then the water vapor pervaporate is sterile.

The water still of the various embodiments of the present invention is generally simple to manufacture and can be deployed quickly if need be. Furthermore, the simple mechanical design renders the water still relatively low cost. The various preferred and optional features can be mixed and matched between the various design variants shown in the accompanying figures.

The amount of water collected (over, say, a twenty-four hour period) by each water still embodying the inventive concepts of the present invention is unlikely to provide a yield per unit surface area as high as that in optimized laboratory conditions. However, this can be redressed by increasing the surface area of membrane in each water still while also ensuring that performance of the water still is optimized as far as possible, e.g. by providing effective removal of water vapor from the air within the chamber.

As regards collection techniques, it is contemplated that many water stills according to the various aspects of the present invention can be linked together such that there is either interconnecting passages between the individual chambers, or that the condensed potable water can be collected and drawn off, i.e. tapped, centrally.

Whilst it may be beneficial to have the water still of the present invention float, it may be equally desirable that it be held in place (and either fully or partially immersed in the contaminated water source 24). Indeed, with a permanently located water still, there is no need for the still to be made buoyant and so it may always be located below any tidal water line, for example. Indeed, with full immersion of the water still, the condensation process would benefit from the lower overall temperature achieved within the water still by virtue of the surrounding contaminated water supply 24.

It will, of course, be appreciated that the above description has been given by way of example only and that modifications in detail may be made within the scope of the present invention. For example, the water still of the present invention is neither restricted in shape nor size. Indeed, the tapping of water can be achieved using one or several outlet, with the design of outlet ideally ensuring that potable water purged from the water collection well 16 and external contaminants do not respectively re-enter or enter the water collection well 16. In this latter respect, the tap of piping-off could be double-vented. Should the water still be employed in an area of low water levels, it is envisaged that the water collection well could be considerably flattened to ensure that contact between the water source 24 and the hydrophilic membrane base 14 is optimized. Whilst it is clearly preferably to have the submerged base entirely made from membrane material to optimize water contact, this is clearly a design option since the hydrophilic membrane could be incorporated within an impervious framework (for strength purposes) so that merely a substantial proportion of the lower surface (i.e. the base) of the still is in contact with the water source 24.

It is contemplated that materials other than hydrophilic membranes, as defined, could be used in to context of the water still arrangement disclosed herein. However, other materials generally clog and block over time, and so a non-porous vapor permeable membrane is clearly preferred.

The invention claimed is:

1. A water still for placement on or in a body of contaminated water for collecting condensed water vapor comprising:
    a chamber having a substantially impervious upper section and a base coupled to the substantially impervious upper section, the base formed from a membrane, said membrane being of a material which performs membrane separation by preferentially absorbing water molecules over sodium and chloride ions and transporting said water molecules across said membrane as a vapor such that in the presence of a humidity differential where said membrane has a high humidity side and a low humidity side, water vapor is released from the low humidity side; and
    a water collection well having an opening into which condensed water vapor can collect, the water collection well sited within the base and generally extended outwardly therefrom,
    wherein the water collection well acts, in use, as a heat sink of the water still.

2. The water still according to claim 1, further including a plurality of condensation trays formed within the chamber.

3. The water still according to claim 2, wherein the plurality of condensation trays cause condensed water vapor to be ferried into the water collection well.

4. The water still according to claim 1, the impervious section having an inner surface on which water vapor condenses, the water still further including a peripheral gully and channel arrangement configured to collect the condensed water vapor formed on the inner surface and arranged to direct the condensed water vapor so formed into the water collection well.

5. The water still according to claim 1, further including a central shaft coupled to the water collection well and extending substantially upward into the chamber, the central shaft acting as at least one of a structural support for the substantially impervious upper section, a condensation surface and a thermal path.

6. The water still according to claim 1, wherein the water collection well includes a plurality of vanes.

7. The water still according to claim 1, wherein the membrane of the base is corrugated to increase surface area.

8. The water still according to claim 1, wherein the water collection well includes an outward-facing lip.

9. The water still according to claim 1, wherein the water collection well includes an internal lip that limits spillage from the water collection well.

10. The water still according to claim 1, wherein the opening of the water collection well is generally sited above a highest nominal base level.

11. The water still according to claim 1, further including guidelines coupling a periphery of the water still to the water collection well.

12. The water still according to claim 1, comprising a mechanically-driven fan within the chamber.

13. The water still according to claim 1, comprising an intersection between the substantially impervious upper section and the base, said intersection being protected by an external buffer.

14. The water still according to claim 1, further comprising a reservoir formed from a substantially impervious pouch and the base, the reservoir arranged to receive and store contaminated water.

15. A water still for placement on or in a body of contaminated water for collecting condensed water vapor comprising:
    a chamber having a substantially impervious upper section and a base coupled to the substantially impervious upper section, the base formed from a membrane, said membrane being of a material which performs membrane separation by preferentially absorbing water molecules over sodium and chloride ions and transporting said water molecules across said membrane as a vapor such that in the presence of a humidity differential where said membrane has a high humidity side and a low humidity side, water vapor is released from the low humidity side; and
    a water collection well having an opening into which condensed water vapor can collect, the water collection well sited within the base of the water still and generally extended outwardly therefrom,
    wherein the base is sloped.

16. The water still according to claim 15, wherein the base includes a drain vent.

17. A water still for placement on or in a body of contaminated water for collecting condensed water vapor comprising:
    a chamber having a substantially impervious upper section and a base coupled to the substantially impervious upper section, the base formed from a membrane, said membrane being of a material which performs membrane separation by preferentially absorbing water molecules over sodium and chloride ions and transporting said water molecules across said membrane as a vapor such that in the presence of a humidity differential where said membrane has a high humidity side and a low humidity side, water vapor is released from the low humidity side; and
    a water collection well having an opening into which condensed water vapor can collect, the water collection well sited within the base of the water still and generally extended outwardly therefrom,
    wherein the membrane comprises a copolyetherester elastomer with a water vapor transmission rate at least 400 g/m$^2$/24 hr.

18. A water still for placement on or in a body of contaminated water for collecting condensed water vapor comprising:
    a humidity chamber formed between a substantially impervious section and a non-porous membrane; said membrane being of a material which performs membrane separation by preferentially absorbing water molecules over sodium and chloride ions and transporting said water molecules across said membrane as a vapor such that in the presence of a humidity differential where said membrane has a high humidity side and a low humidity side, water vapor is released from the low humidity side;
    a water collection well having an opening into which condensed water vapor can collect, the water collection well sited towards a base of the humidity chamber said still having a buoyancy that allows it to be at least substantially immersed in contaminated water so that said non-porous membrane is beneath the water; and
    a protective screen juxtaposed the non-porous membrane of the water still.

19. The water still as claimed in claim 18, wherein the substantially impervious section provides side walls and a base for the water still and thereby acts to funnel condensed water vapor into the water collection well.

20. The water still as claimed in claim 18, wherein the non-porous membrane provides a ceiling to the humidity chamber.

21. The water still as claimed in claim 20, wherein the non-porous membrane is inclined.

22. A method of purifying contaminated water, comprising:
- forming a humidity chamber having a substantially impervious upper surface coupled to a membrane base; said membrane base being of a material for performing membrane separation by preferentially absorbing water molecules over sodium and chloride ions and transporting said water molecules across said membrane such that in the presence of a humidity differential where said membrane has a high humidity side and a low humidity side, water vapor is released from the low humidity side;
- providing a water collection well having an opening within the humidity chamber;
- providing a contaminated water supply juxtaposed the membrane base by placing the humidity chamber on or in a body of contaminated water, thereby forming a vapor pressure gradient thereacross; producing vapor that can be condensed and directed within the humidity chamber;
- directing water vapor condensed within the humidity chamber into the opening; and
- sinking heat generated within the humidity chamber through the contaminated water via the water collection well.

23. The method of purifying contaminated water according to claim 22, further comprising channeling water vapor condensed within the humidity chamber away from the membrane base and into the water collection well.

24. The method of purifying contaminated water according to claim 22, further comprising periodically tapping water collected within the water collection well.

25. A method of purifying contaminated water, comprising:
- forming a humidity chamber having a substantially impervious upper surface coupled to a membrane base; said membrane base being of a material for performing membrane separation by preferentially absorbing water molecules over sodium and chloride ions and transporting said water molecules across said membrane such that in the presence of a humidity differential where said membrane has a high humidity side and a low humidity side, water vapor is released from the low humidity side;
- providing a water collection well having an opening within the humidity chamber;
- providing a contaminated water supply juxtaposed the membrane base by placing the humidity chamber on or in a body of contaminated water, thereby forming a vapor pressure gradient thereacross; producing vapor that can be condensed and directed within the humidity chamber;
- directing water vapor condensed within the humidity chamber into the opening;
- wherein the membrane base comprises a copolyetherester elastomer with a water vapor transmission rate at least 400 g/m$^2$/24 hr.

26. A method of purifying contaminated water, comprising:
- forming a humidity chamber having a substantially impervious surface coupled to a non-porous membrane that supports membrane separation by absorption and transport of water across the membrane;
- providing a water collection well having an opening towards a bottom of the humidity chamber;
- contacting a contaminated water supply with the non-porous membrane by immersing said chamber in said contaminated water at least substantially, thereby forming a vapor pressure gradient thereacross;
- directing water vapor condensed within the humidity chamber into the opening under the action of gravity;
- wherein the step of contacting occurs from above the non-porous membrane.

* * * * *